Jan. 26, 1960      M. L. ABEL      2,922,682
SELF-ALIGNING BEARING
Filed May 20, 1957
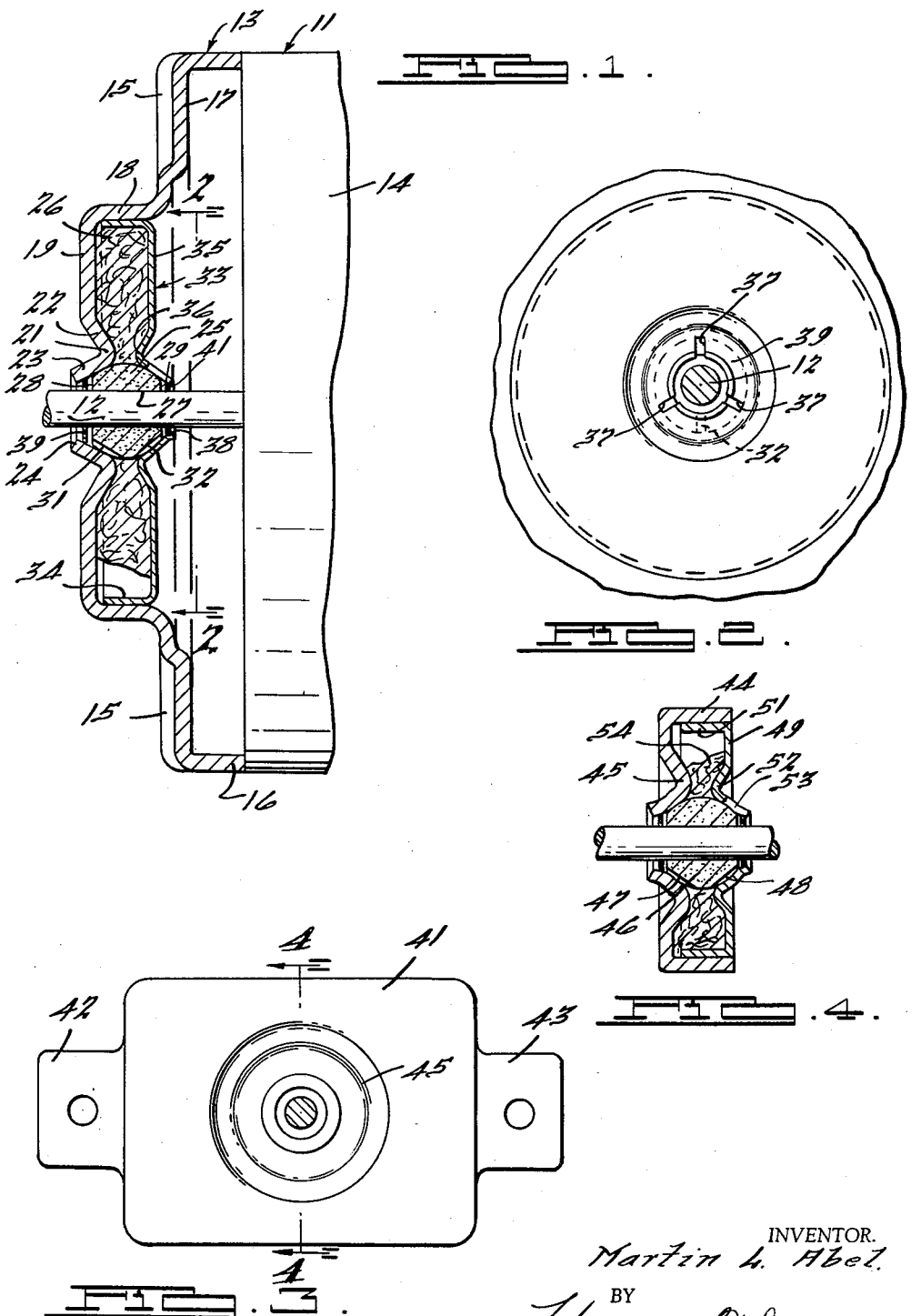
INVENTOR.
Martin L. Abel.
BY
Harness, Dickey & Pierce.
ATTORNEYS.

United States Patent Office 2,922,682
Patented Jan. 26, 1960

2,922,682

SELF-ALIGNING BEARING

Martin L. Abel, Detroit, Mich., assignor to Tann Corporation, Detroit, Mich., a corporation of Michigan Application May 20, 1957, Serial No. 660,311

6 Claims. (Cl. 308—132)

This invention relates to bearings, and more particularly to a self-aligning and self-lubricating bearing of simple construction.

It is an object of the invention to provide a novel and improved mounting means for self-aligning bearings which has wicking material associated therewith for lubricating the bearing.

It is another object to provide an improved bearing and mounting construction having a lubricating system associated therewith in which the lubricating oil is constantly recirculated between the bearing and wicking material by the inherent action of the rotating shaft.

Other objects, features and advantages of the present invention will become apparent from the subsequent description, taken in conjunction with the accompanying drawing, wherein:

Figure 1 is a sectional view in elevation of an electric motor end bell provided with a bearing assembly constructed in accordance with the principles of the invention;

Fig. 2 is a broken sectional view of the structure illustrated in Fig. 1;

Fig. 3 is a view of structure, similar to that illustrated in Fig. 2, showing another form of the invention, and Fig. 4 is a sectional view of the structure illustrated in Fig. 3, taken on the line 4—4 thereof.

The bearing of the present invention may be used on any rotating structure, and by way of example is herein illustrated in conjunction with an electric motor 11 having a shaft 12 extending from one end thereof. In Figures 1 and 2, a circular end bell, generally indicated at 13, is secured to one end of a motor casing 14 by means of bolts (not shown) passing through the bosses 15 which are formed on the bell. The end bell 13 comprises an outer cylindrical flange portion 16 of the same diameter as the casing 14, a first radial wall 17, a cylindrical section 18 of smaller diameter than the section 16, a second radial wall 19 extending inwardly from the section 18, and a bearing-engaging section 21. The cylindrical section 18 extends axially outward, so that the section 18 and the wall 19 together form a recessed portion for the reception of a retaining cup, as described in detail below. The central portion of the wall 19 has the bearing-engaging section 21 formed by the inwardly deflected annular portion 22 and the outwardly deflected portion 23, both of truncated conical section. The section 23 terminates in an aperture 24 for the shaft 12 of the motor.

A self-aligning bearing 25 for supporting the shaft 12 is of spherical shape, having an aperture 27 through which the shaft extends. The wicking material 26 is of any suitable material that will retain suitable quantities of the oil to be used for lubricating the shaft 12 such as, for example, wool or cotton waste fibers or small chopped-up cellulose fibers. The bearing 25 is fabricated of sintered metal having porous properties which enable lubricating oil applied to its outer surface to penetrate through the body to the aperture 27 and the shaft 12. The bearing 25, being of spherical shape, may rotate in its support and be self-aligning with respect to shaft 12. Radially disposed surfaces 28 and 29 are provided at the opposite ends of bearing 25, and a pair of axially extending inclined slots 31 and 32 lead from the lower portions of these end surfaces toward the central lower portion of bearings 25. Slots 31 and 32 serve as oil return slots, as will be described more fully below.

The bearing 25 is supported by end bell 13 and a circular retainer cup, generally indicated at 33, in such a manner that it may freely adjust itself to shaft 12 during operation. Retainer cup 33 is adapted to fit within cylindrical section 18 of end bell 13 so as to form, together with wall 19 of the end bell, an annular compartment for the retention of wick 26, the inner portion of this compartment being in communication with the outer surface of bearing 25. More specifically, cup 33 has an outer cylindrically shaped flange 34 which fits snugly within section 18 and a main wall 35 in spaced parallel relation with wall 19 of end bell 13. The inner portion of cup 33 is provided with a section 36 of V-shaped cross-sectional configuration, this section being approximately symmetrical with section 21 of end bell 13 about an imaginary plane passing through the center of bearing 25 at right angles to the axis of shaft 12. A plurality of radial slots 37 are provided at the inner portion of cup section 36, these slots extending outwardly from an inner clearance aperture 38. There are thus formed at the inner portion of cup section 36 a plurality of peripherally spaced springlike fingers 39. These fingers, together with inclined section 23 of bell 13, have annular surfaces, illustratively of frustoconical shape in Figure 1, which will slidably engage the spherical outer surface of bearing 25 when the latter is held between end bell 13 and retainer cup 33. The dimensions of the parts are preferably such that when retainer cup 33 is in assembled position, spring fingers 39 will exert a light force on bearing 25 to prevent any unwarranted axial movement of the bearing. A pair of fiber disks 41 on the shaft 12 abut the inner surface of the truncated conical portion 23 and fingers 39 of the end bell 13 and retainer cup 33 in spaced relation to the ends of the bearing 25 and serve to prevent the passage of the oil along the shaft 12.

In assembling the novel bearing and support, it is merely necessary to assemble fiber disk 39, bearing 25, and oil-saturated wick 26 to end bell 13, thereafter slipping retainer cup 33 with its fiber disk 41 into position within the end bell. Bearing 25 will be held between section 23 of end bell 13 and fingers 39 of retainer cup 33, with slots 31 and 32 disposed at the bottom of the bearing. The end bell and its assembled parts may then be secured to casing 14 of electric motor 11, bearing 25 being slipped over shaft 12.

During operation, lubricating oil from wicking material 26 will flow from the outer surface of bearing 25 through the interstices of the sintered metal to inner bearing surface 27, thus maintaining a film of oil between the bearing and shaft. When motor 11 is energized, rotation of shaft 12 with respect to bearing 25 will create a pumping action by means of which this film of oil will flow from the central portion of bearing surface 27 toward end faces 28 and 29 of the bearing. This pumping action will be caused by the inherent relative movement of the bearing and shaft surfaces, the oil tending to flow toward the open end portions of these surfaces. As the oil reaches the spaces between bearing surfaces 28 and 29 and fiber disks 39 and 41 respectively, it will run down through slots 31 and 32 and re-enter wick 26, becoming available for re-supply to bearing 25. It will thus be seen that the invention enables bearing 25 to be continuously lubricated without the necessity for periodic re-oiling. The self-aligning function of the bearing will not be interfered with, since end bell section 23 and fingers 39 of retainer cup 33 will permit rocking action of the spherical bearing to accommodate movements of the shaft axis.

Figures 3 and 4 illustrate a modified form of the invention applied to a rectangularly shaped end bell 41 having ears 42 and 43 securable to the main motor casing (not shown). As in the previous embodiment, end bell 41 has an outer flange 44 and an inner portion 45 for slidably engaging a spherical bearing 46. The latter is of sintered metal and shaped like bearing 25 of the previous embodiment, having a pair of oil return slots 47 and 48. A retainer cup 49 is provided, this cup having an outer rectangular flange 51 which fits snugly within end bell flange 44, and an inner circular section 52 having spring fingers 53 for engagement with bearing 44. A wick 54 is disposed within the compartment formed by retainer cup 49 and the recessed portion of end bell 41. The method of assembly and the operation of this embodiment of the invention will be similar to that previously described.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In combination, an electric motor end bell having an outer flange section extending in one direction, a first wall extending inwardly from said flange, a cylindrical section extending from the inner edge of said wall in the direction opposite said flange, a second wall extending inwardly from said cylindrical section, and a central shaft clearance aperture, a retaining cup having a cylindrical outer flange fitting within the cylindrical section of said end bell, a wall in spaced relation with the second wall of said end bell, and a shaft clearance aperture coaxial with the end bell clearance aperture, a bearing having a spherical outer surface and an internal bore disposed between said clearance apertures, a surface on said end bell between said end bell wall and said clearance aperture engageable with said bearing to limit axial movement of the bearing in one direction, and a plurality of spring fingers on said retaining cup between the clearance aperture and second wall thereof engageable with said bearing to urge the bearing against said end bell surface.

2. In combination, an electric motor end bell having an outer flange section extending in one direction, a first wall extending inwardly from said flange, a cylindrical section extending from the inner edge of said wall in the direction opposite said flange, a second wall extending inwardly from said cylindrical section, and a central shaft clearance aperture, a retaining cup having a cylindrical outer flange fitting within the cylindrical section of said end bell, a wall in spaced relation with the second wall of said end bell, and a shaft clearance aperture coaxial with the end bell clearance aperture, a sintered metal bearing having a spherical outer surface and an internal bore disposed between said clearance apertures, oppositely disposed bearing retaining surfaces on said end bell and retainer cup engageable with the spherical surface of said bearing, and a pair of oil return slots formed in the lower portion of said bearing on opposite sides thereof, said slots connecting the ends of said bearing with a portion of the bearing engaged by a wick adapted to be disposed in the annular space between said end bell and retaining cup.

3. In a bearing construction for electric motors or the like, an end bell having a cylindrical section and an adjoining radial wall extending inwardly therefrom, a retainer cup having an outer cylindrical flange fitting within said cylindrical end bell section and a radial wall in spaced parallel relation with the radial wall of said end bell, a pair of oppositely disposed annular surfaces on said end bell and retainer cup respectively adapted to retain a spherical bearing therebetween, the compartment formed between said end bell and retaining cup being in communication with the bearing space between said surfaces, the bearing retaining surface on said retaining cup being formed into a plurality of spring-like fingers, whereby a bearing held between said surfaces will be held against substantial axial movement, and an oil return slot in the bottom of said bearing connecting one end of the bearing with said compartment.

4. In a bearing construction for electric motors, an end bell having a cylindrical section and a radial section extending inwardly therefrom, a retainer cup having a cylindrical section fitting within said end bell cylindrical section and a radial wall in spaced parallel relation with the radial wall of said end bell to form an annular inwardly open compartment, a pair of oppositely disposed bearing retaining surfaces on said end bell and retainer cup respectively, a spherical sintered metal bearing disposed between said retaining surfaces, the surfaces being so shaped as to permit rocking movement of the spherical bearing, the open inner portion of said compartment being in communication with the central outer surface of said bearing, a wick having oil-retaining properties disposed within said compartment and adapted to supply lubricating oil to the outer surface of said bearing, a pair of sealing disks in spaced relation with the opposite ends of said bearing, and a pair of oil return slots in the bottom of said bearing connecting the spaces between the bearing ends and said disks with the portion of said bearing in communication with said wick, whereby oil flowing toward said bearing ends will be returned to said wick.

5. The combination according to claim 4, the bearing retaining surface on said retainer cup being formed into a plurality of spring-like fingers, said oppositely disposed bearing retaining surfaces being so spaced as to cause said fingers to urge said bearing against the retaining surface on said end bell.

6. In a bearing construction for electric motors, an end bell having a cylindrical section and a section extending inwardly therefrom, a retainer cup having a cylindrical section fitting within said end bell cylindrical section and a wall in spaced relation with the wall of said end bell to form an annular inwardly open compartment, a pair of oppositely disposed bearing retaining surfaces on said end bell and retainer cup respectively, a spherical sintered metal bearing disposed between said retaining surfaces, the surfaces being so shaped as to permit rocking movement of the spherical bearing, the open inner portion of said compartment being in communication with the central outer surface of said bearing, a wick having oil-retaining properties disposed within said compartment and adapted to supply lubricating oil to the outer surface of said bearing, a pair of sealing disks in spaced relation with the opposite ends of said bearing, and a pair of oil return slots at the bottom portion of said bearing connecting the spaces between the bearing ends and said disks with the portion of said bearing in communication with said wick, whereby oil flowing toward said bearing ends will be returned to said wick.

References Cited in the file of this patent

UNITED STATES PATENTS

| | | |
|---|---|---|
| 2,083,688 | Clements | June 15, 1937 |
| 2,143,201 | Martinet et al. | Jan. 10, 1939 |
| 2,270,392 | Talmage et al. | Jan. 20, 1942 |
| 2,300,957 | Miner | Nov. 3, 1942 |
| 2,308,609 | Koch | Jan. 19, 1943 |
| 2,316,693 | Hoddy | Apr. 13, 1943 |
| 2,770,505 | Jordan | Nov. 13, 1956 |
| 2,845,552 | Robinson | July 29, 1958 |